No. 809,965. PATENTED JAN. 16, 1906.
A. O. LYSTNE.
FISHING DEVICE.
APPLICATION FILED JULY 21, 1902.

Witnesses:

Inventor:
Andrew O Lystne
Per Anton Thompson
Attorney

UNITED STATES PATENT OFFICE.

ANDREW O. LYSTNE, OF EAGLE LAKE, MINNESOTA.

FISHING DEVICE.

No. 809,965.  Specification of Letters Patent.  Patented Jan. 16, 1906.

Application filed July 21, 1902. Serial No. 116,478.

*To all whom it may concern:*

Be it known that I, ANDREW O. LYSTNE, a citizen of the United States, residing in the town of Eagle Lake, in the county of Ottertail and State of Minnesota, have invented a new and useful Fishing Device, of which the following is a specification.

My invention relates to a device to be used for fishing purposes without the use of a boat;
and the object of my invention is to enable any person or persons to fish by the use of this new fishing device at any distance from shore by walking along the shore of any lake or river and thus save the trouble and expense of obtaining a boat. I attain these objects by the device illustrated in the accompanying drawings, in which—

Figure 1:
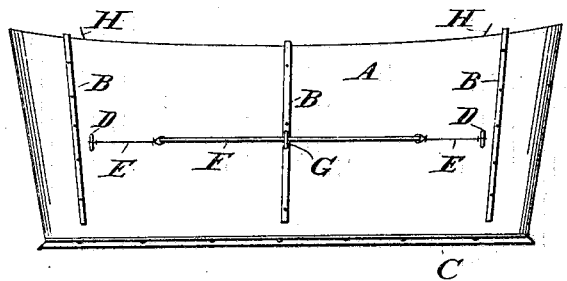
Figure 2:
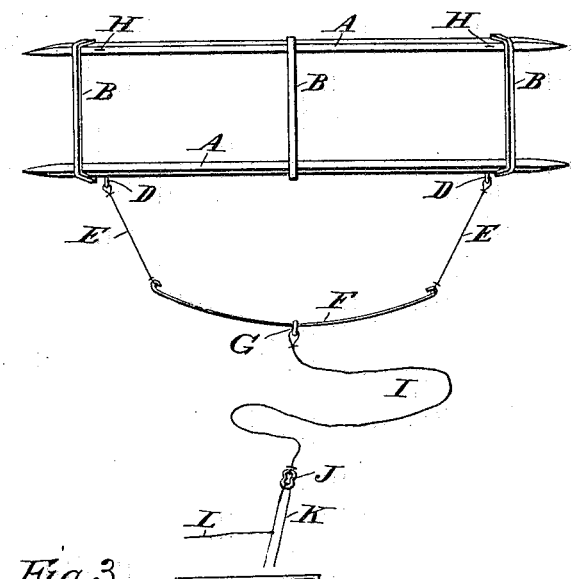
Figure 3:
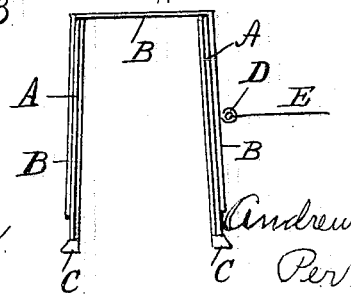

Figure 1 is a side view of the device, and Fig. 2 is a top view of the device. Fig. 3 is an end view thereof.

The letters refer to the different parts of the device and are herein used in referring to and describing the device.

A represents main boards thirty-four inches long on top and thirty inches long at bottom, both boards being uniform and tapering at both ends. At the bottom of each of the boards A is fastened a lead rod C, weighing three and one-fourth pounds, making a total weight of six and one-half pounds in both boards. These two boards A are fastened parallel to each other six and one-half inches apart on top and seven inches apart at bottom and tapering at the ends so that the device will move easily in water. The pins H are put into one main board A for the purpose of winding the fishing-lines.

B represents the iron braces embedded into the wood, holding the boards in place.

D represents staples fastened into the main board A, to which are fastened the strings E, each string being eight inches long. To these strings is fastened the spring-wire rod F, which is eighteen inches long.

G is a ring which slides on the wire F, so that when the party using the device walks up one way the ring will slide up to the end of the wire and the same in reversing the action.

I is a string twenty-six inches long fastened in one end to ring G. At the other end of string I is fastened iron ring J.

K represents the fish-line as it is run through ring J, and L represents the short string to which is attached the hook for fishing. One or more hooks can be used. K will show that the hook and string L can be pulled ashore by letting the line K slide through the ring J.

This device can be used in any water and at any distance from the shore to suit the operator by walking along the shore of the lake or river. The device is placed in the water, the line K being run through the ring J and by walking up one way pulling the line K the device will move out in the water to such a distance as the operator may desire and will move along with ease to any point the operator may desire, the hooks being fastened to line K, and when a fish gets on the line L the operator pulls in the line K by letting it slide through the ring J, the device remaining out in the lake or river, and when the fish is taken off the hook will be pulled out again by sliding the line out through the ring J. The ring G will slide on the wire F when the operator wishes to reverse the action and walk in opposite direction.

This device is easily carried in any kind of vehicle and can be used by any one for fishing without the use of a boat in any water and at any distance from the shore.

Having fully described my invention, what I claim as new, and desire to secure by Letters Patent, is—

1. A float comprising a pair of boards with their bottom edges weighted and arranged parallel and their lower portions diverging from each other, and braces for rigidly holding the boards in such position; in combination with a rod having a flexible connection at each end with the side of one of the boards, a ring slidable on the rod, and a fishing-line carried by the ring.

2. In a device of the character described, a float, a yielding spring-wire rod having a flexible connection at each end with the float, a ring slidable on the rod, and a fishing-line carried by the ring.

3. In a device of the character described, a float, a yielding spring-rod connected to the float in a horizontal position, a ring slidable on the rod, and a fishing-line passed through the ring, whereby the float may be trolled at a distance by means of the fishing-line and when the direction of pull is changed the yielding nature of the spring-rod causes it to bow to offer less resistance to the passage of the ring to the other end thereof.

In testimony whereof I have signed my name to this specification, in the presence of two subscribing witnesses, this 10th day of July, A. D. 1902.

ANDREW O. LYSTNE.

Witnesses:
SYVER VINJE,
J. B. THOMPSON.